United States Patent
Groenewolt et al.

(10) Patent No.: US 10,100,222 B2
(45) Date of Patent: *Oct. 16, 2018

(54) COATING MATERIAL COMPOSITIONS AND COATINGS PRODUCED THEREFROM COMBINING HIGH SCRATCH RESISTANCE AND GOOD POLISHABILITY AND GOOD OPTICAL PROPERTIES, AND USE THEREOF

(71) Applicant: BASF Coatings GmbH, Münster (DE)

(72) Inventors: Matthijs Groenewolt, Münster (DE); Berthold Austrup, Nordkirchen (DE); Katharina Hübner, Drensteinfurt (DE); Jörg Müller, Hamm (DE); Silke Hanning, Dülmen (DE); Andrea Frank, Billerbeck (DE)

(73) Assignee: BASF Coatings GmbH, Muenster (DE)

( * ) Notice: Subject to any disclaimer, the term of this patent is extended or adjusted under 35 U.S.C. 154(b) by 411 days.

This patent is subject to a terminal disclaimer.

(21) Appl. No.: 14/649,473

(22) PCT Filed: Oct. 18, 2013

(86) PCT No.: PCT/EP2013/071883
§ 371 (c)(1),
(2) Date: Nov. 19, 2015

(87) PCT Pub. No.: WO2014/086530
PCT Pub. Date: Jun. 12, 2014

(65) Prior Publication Data
US 2016/0122583 A1    May 5, 2016

Related U.S. Application Data

(60) Provisional application No. 61/732,423, filed on Dec. 3, 2012.

(30) Foreign Application Priority Data

Dec. 3, 2012 (EP) ..................................... 12195235

(51) Int. Cl.
| | |
|---|---|
| *C09D 175/14* | (2006.01) |
| *B05D 5/00* | (2006.01) |
| *B05D 7/14* | (2006.01) |
| *B05D 5/06* | (2006.01) |
| *C08K 3/36* | (2006.01) |
| *B05D 7/00* | (2006.01) |
| *C08G 18/62* | (2006.01) |
| *C08G 18/72* | (2006.01) |

(Continued)

(52) U.S. Cl.
CPC ............. *C09D 175/14* (2013.01); *B05D 5/00* (2013.01); *B05D 5/061* (2013.01); *B05D 7/14* (2013.01); *B05D 7/57* (2013.01); *C08G 18/289* (2013.01); *C08G 18/6229* (2013.01); *C08G 18/6254* (2013.01); *C08G 18/722* (2013.01); *C08G 18/809* (2013.01); *C08K 3/36* (2013.01); *C09D 175/04* (2013.01)

(58) Field of Classification Search
CPC .............. C08G 18/289; C08G 18/6229; C08G 18/6254; C08G 18/722; C08G 18/809; C08K 3/36; C09D 175/04; C09D 175/14; B05D 5/00; B05D 5/061; B05D 7/14; B05D 7/57; Y10T 428/31551; Y10T 428/31583; Y10T 428/31587; Y10T 428/31605
USPC .... 428/423.1, 424.7, 424.8, 425.8; 524/506; 106/287.11
See application file for complete search history.

(56) References Cited

U.S. PATENT DOCUMENTS

| | | | |
|---|---|---|---|
| 4,598,131 A | 7/1986 | Prucnal | |
| 4,710,542 A | 12/1987 | Forgione et al. | |

(Continued)

FOREIGN PATENT DOCUMENTS

| | | |
|---|---|---|
| DE | 102005045228 | 4/2007 |
| DE | 102009024103 | 12/2010 |

(Continued)

OTHER PUBLICATIONS

PCT International Search Report in PCT/EP2013/071883, dated May 22, 2014, 2 pages.

(Continued)

*Primary Examiner* — Thao T Tran
(74) *Attorney, Agent, or Firm* — Servilla Whitney LLC

(57) ABSTRACT

The present invention provides nonaqueous coating material compositions, multistage coating processes and also the use of the coating material compositions, comprising
(A) at least one polyhydroxyl-group-containing compound,
(B1) at least one polyisocyanate-group-containing compound (B1) having free or blocked isocyanate groups and having a cycloaliphatic polyisocyanate parent structure, and/or a polyisocyanate derived therefrom,
(B2) at least one polyisocyanate-group-containing compound (B2) having free or blocked isocyanate groups and having an acyclic, aliphatic polyisocyanate parent structure, and/or a polyisocyanate derived therefrom,
(D) at least one catalyst for the crosslinking of silane groups, and
(R) at least one rheological assistant (R) based on fumed silica,
where component (B1) and/or component (B2) comprise at least one structural unit $$—NR—(X—SiR''{}_x(OR')_{3-x}) \qquad (I),$$

and/or at least one structural unit $$—N(X—SiR''{}_x(OR')_{3-x})_n(X'—SiR''{}_y(OR')_{3-y})_m \qquad (II).$$

15 Claims, No Drawings

(51) Int. Cl.
  *C08G 18/80* (2006.01)
  *C09D 175/04* (2006.01)
  *C08G 18/28* (2006.01)

(56) References Cited

U.S. PATENT DOCUMENTS

| | | | |
|---|---|---|---|
| 5,716,678 | A | 2/1998 | Rockrath et al. |
| 6,492,482 | B2 | 12/2002 | Lomoelder et al. |
| 7,153,357 | B2 | 12/2006 | Baumgart et al. |
| 8,013,099 | B2 | 9/2011 | Poppe et al. |
| 8,486,539 | B2 | 7/2013 | Klein et al. |
| 8,569,438 | B2 | 10/2013 | Groenewolt et al. |
| 8,679,589 | B2 | 3/2014 | Groenewolt et al. |
| 8,956,727 | B2 | 2/2015 | Poppe et al. |
| 9,017,818 | B2 | 4/2015 | Groenewolt et al. |
| 9,371,469 | B2 * | 6/2016 | Groenewolt ....... C08G 18/6229 |
| 2003/0027921 | A1 | 2/2003 | Speier et al. |
| 2008/0220173 | A1 * | 9/2008 | Poppe ................ C08G 18/222 427/407.1 |
| 2010/0015344 | A1 * | 1/2010 | Groenewolt ......... C08G 18/289 427/407.1 |
| 2010/0028544 | A1 * | 2/2010 | Groenewolt ......... C08G 18/289 427/384 |
| 2010/0143596 | A1 * | 6/2010 | Groenewolt ......... C08G 18/289 427/379 |
| 2011/0027489 | A1 * | 2/2011 | Groenewolt ......... C08G 18/289 427/387 |
| 2011/0045190 | A1 * | 2/2011 | Groenewolt ....... C08G 18/1883 427/385.5 |
| 2011/0059251 | A1 * | 3/2011 | Poppe ................ C08G 18/2063 427/379 |
| 2011/0245406 | A1 | 10/2011 | Klein et al. |
| 2012/0034457 | A1 * | 2/2012 | Low ..................... C09D 133/08 428/336 |
| 2014/0329098 | A1 * | 11/2014 | Groenewolt ......... C08G 18/289 428/423.1 |
| 2015/0344728 | A1 * | 12/2015 | Groenewolt .......... B05D 5/005 428/331 |

FOREIGN PATENT DOCUMENTS

| | | |
|---|---|---|
| EP | 0245700 | 11/1987 |
| EP | 0994117 | 4/2000 |
| EP | 0692007 | 12/2001 |
| EP | 1193278 | 4/2002 |
| EP | 1273640 | 1/2003 |
| EP | 1527144 | 1/2011 |
| WO | WO-94/22968 | 10/1994 |
| WO | WO-01/09260 | 2/2001 |
| WO | WO-01/98393 | 12/2001 |
| WO | WO-2004/018578 | 3/2004 |
| WO | WO-2005/003340 | 1/2005 |
| WO | WO-2007/033786 | 3/2007 |
| WO | WO-2008/074489 | 6/2008 |
| WO | WO-2008/074490 | 6/2008 |
| WO | WO-2008/074491 | 6/2008 |
| WO | WO-2009/077181 | 6/2009 |
| WO | WO-2010/063332 | 6/2010 |
| WO | WO-2010/149236 | 12/2010 |
| WO | WO-2012/168014 | 12/2012 |
| WO | WO-2012/168079 | 12/2012 |

OTHER PUBLICATIONS

PCT International Written Opinion in PCT/EP2013/071883, dated May 22, 2014, 7 pages.
PCT International Preliminary Report on Patentability in PCT/EP2013/071883, dated Jun. 18, 2015, 9 pages.

* cited by examiner

COATING MATERIAL COMPOSITIONS AND COATINGS PRODUCED THEREFROM COMBINING HIGH SCRATCH RESISTANCE AND GOOD POLISHABILITY AND GOOD OPTICAL PROPERTIES, AND USE THEREOF

CROSS REFERENCE TO RELATED APPLICATIONS

This application is a national phase entry of PCT Application PCT/EP2013/071883, filed Oct. 18, 2013, which claims priority to U.S. Provisional Application 61/732,423, filed Dec. 3, 2012 and EP Patent Application 12195235.2, filed Dec. 3, 2012, the entire contents of which are herein incorporated by reference.

FIELD

The present invention relates to nonaqueous coating material compositions comprising at least one polyhydroxyl-group-containing compound (A), at least polyisocyanate (B) having free or blocked isocyanate groups and having silane groups, and/or the dimer and/or oligomer thereof, at least one catalyst (D) for the crosslinking of the silane groups, and at least one rheological assistant (R) based on fumed silica.

BACKGROUND

Coating materials of this kind are known from, for example, WO 10/063332. The polyhydroxyl-group-containing compound (A) that is used in these coating materials is based on a hyperbranched, dendritic, hydroxy-functional polyester wherein at least one hydroxyl group is esterified with a C8 to C9 monocarboxylic acid. The result coatings exhibit high scratch resistance and weathering stability and also, at the same time, a good overall appearance, although even lower so-called short-wave values at increased film thicknesses of at least 40 μm are desirable. Also deserving of improvement in these coating materials are the sandability and polishability of the resultant coatings.

From WO 08/74491, WO 08/74490, WO 08/74489, WO 09/077181 and WO 10/149236, coating materials are known in which the compound (B) used, containing isocyanate groups and silane groups, is based on known isocyanates, preferably on the biuret dimers and isocyanurate trimers of diisocyanates, more particularly of hexamethylene diisocyanate. These coating material compositions have the advantage over conventional polyurethane coating materials of a significantly improved scratch resistance in combination with good weathering resistance. In need of improvement with these coating materials, besides the sandability and polishability of the resultant coatings, is the appearance. More particularly the overall appearance and the running tendency on vertical surfaces are to be improved.

Furthermore, EP-A-1 273 640 describes two-component coating materials comprising a polyol component and a crosslinker component, consisting of aliphatic and/or cycloaliphatic polyisocyanates or the polyisocyanates derived therefrom by polymerization, allophanate formation, biuret formation or urethane formation, where 0.1 to 95 mol % of the originally free isocyanate groups present have undergone reaction with bisalkoxy-silylamine. These coating materials can be used for producing clearcoats or topcoats in the automotive sector, and, following their complete curing, exhibit good scratch resistance in combination with good resistance to environment effects. This specification, however, contains no information on how the sandability and polishability and the appearance of the resulting coatings can be improved.

WO 07/033786, furthermore, discloses coating materials which as well as phosphonic diesters and diphosphonic diesters, as catalyst (A), comprise silane-group-containing mixtures (B), such as, for example, the mixture of the isocyanate-group-free reaction product (B1) of hexamethylene diisocyanate isocyanurate with N,N-bis(3-trimethoxysilylpropan-1-yl)amine and the isocyanate-group-free reaction product (B2) of isophorone diisocyanate isocyanurate with N-(3-trimethoxysilylpropan-1-yl)-N-n-butylamine, and also optionally, as further additives (C), polyacrylate resins or other binders and crosslinking agents. According to their hardness, the coatings produced from these coating materials again exhibit good scratch resistance combined with good resistance towards chemicals and environmental effects, but the weathering resistance is in need of improvement and the resultant coatings are decidedly brittle. Additionally, here again, there is a lack of details as to how the sandability and polishability and the appearance of the resultant coatings can be improved.

WO 2001/98393 describes two-component coating materials comprising a polyol as binder component and also, as crosslinker component, a mixture of a polyisocyanate (A) and a silane oligomer (B) which contains at least two isocyanate groups and additionally alkoxysilane groups, preferably bisalkoxysilane groups, and which is prepared by reaction of a polyisocyanate (PI) with alkoxysilylamines, preferably with bisalkoxysilylamines, more particularly with bis(3-propyltrimethoxy-silyl)amine. As polyisocyanate (A) and also as polyisocyanate (PI) for preparing component (B) it is preferred to use hexamethylene diisocyanate and isophorone diisocyanate and also their biurets and isocyanurates. These coating materials are used more particularly as primers and are therefore optimized for adhesion to metallic substrates, preferably to aluminum substrates. Details of how the most important properties for clearcoats, in particular the scratch resistance, on the one hand, and also, at the same time, the sandability and polishability and the appearance of the resultant coatings, on the other hand, may be improved are not present in this specification.

EP-B-1 527 144 describes 2-component clearcoat materials based on hydroxyl-containing polyacrylate resins, isocyanurate-group-containing hexamethylene diisocyanate as crosslinking agent, and a mixture of hydrophilic and hydrophobic nanoparticles based on silicon dioxide. These coating materials lead to highly glossy, scratch proof coatings that are free from surface defects. Still deserving of improvement, however, besides the scratch resistance and weathering stability, are, in particular, the optical properties, and especially the leveling values.

The as yet unpublished international patent application PCT/EP 2012/059611 and the international patent application PCT/EP2012/058355, not yet laid open, finally, describe coating materials of the aforementioned type that lead to coatings featuring enhanced polishability. This is achieved in particular through the use, as compound (B) containing isocyanate groups and silane groups, of a mixture of a compound (B1) having a cycloaliphatic polyisocyanate parent structure and a compound (B2) having an acyclic aliphatic polyisocyanate parent structure. The addition of rheological assistants based on fumed silica to the coating materials is not described in these applications.

DETAILED DESCRIPTION

Problem

A problem addressed by the present invention, therefore, was that of providing coating material compositions, more particularly for automotive OEM finishing and automotive refinishing, that lead to coatings that are scratch-resistant to a high degree and more particularly exhibit high gloss retention after scratch exposure. At the same time, however, the resultant coatings ought also to ensure good sandability and good polishability. In particular the resultant coatings are to have a very good overall appearance.

The overall appearance was assessed by measuring the surface profile of the applied and baked coating films by means of the Wave Scan method, which allows a measurement of the visible profile of paint film surfaces. This was done by measuring the intensity of the reflection ("waviness") by means of the "Wave Scan" instrument from Byk-Gardner, recording 1250 measurement points over a distance of 10 cm. The reflection is divided by the instrument into long-waviness ("long-wave"), i.e. the variance in light intensity for structures in the range from 0.6 to 10 mm, and short-waviness ("short-wave"), i.e. the variance in light intensity for structures in the range from 0.1 mm to 0.6 mm. For a good appearance, besides low long-wave measurement values for the resultant coatings, with very low film thicknesses, it is particularly low short-wave measurement values, with a film thickness of around 40 µm, that are decisive. It is decisive that the long-wave value is more important if the metal panel is viewed from a distance, whereas the short-wave value becomes very important if the panel is viewed from close up.

Furthermore, coating material compositions ought to be provided that lead to a network that is weathering-stable to a high degree and that, at the same time, ensure high acid resistance. Moreover, the coatings and paint systems, especially the clearcoats, ought to be able to be produced even in film thicknesses>40 µm without stress cracks occurring. The coating materials, furthermore, ought to meet the requirements typically imposed on the clearcoat of automotive OEM finishes and automotive refinishes.

The new coating materials, lastly, ought to be preparable easily and very reproducibly, and ought not to present any environmental problems in the course of paint application.

Solution

In light of the objectives stated above, nonaqueous coating material compositions have been found, comprising
(A) at least one polyhydroxyl-group-containing compound (A),
(B1) at least one polyisocyanate-group-containing compound (B1) having free or blocked isocyanate groups and having a cycloaliphatic polyisocyanate parent structure and/or a polyisocyanate parent structure that is derived from one such cycloaliphatic polyisocyanate by trimerization, dimerization, urethane formation, biuret formation, uretdione formation and/or allophanate formation,
(B2) at least one polyisocyanate-group-containing compound (B2), different from component (B1), having free or blocked isocyanate groups and having an acyclic, aliphatic polyisocyanate parent structure and/or a polyisocyanate parent structure that is derived from one such acyclic aliphatic polyisocyanate by trimerization, dimerization, urethane formation, biuret formation, uretdione formation and/or allophanate formation,
(D) at least one catalyst (D) for the crosslinking of silane groups, and
(R) at least one rheological assistant (R) based on fumed silica, where component (B1) and/or component (B2) comprise at least one structural unit of the formula (I)

$$-NR-(X-SiR''_x(OR')_{3-x}) \qquad (I),$$

and/or at least one structural unit of the formula (II)

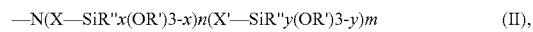

$$-N(X-SiR''_x(OR')_{3-x})_n(X'-SiR''_y(OR')_{3-y})_m \qquad (II),$$

where
R=hydrogen, alkyl, cycloalkyl, aryl or aralkyl, it being possible for the carbon chain to be interrupted by nonadjacent oxygen, sulfur or NRa groups, where Ra=alkyl, cycloalkyl, aryl or aralkyl,
R'=hydrogen, alkyl or cycloalkyl it being possible for the carbon chain to be interrupted by nonadjacent oxygen, sulfur or NRa groups, where Ra=alkyl, cycloalkyl, aryl or aralkyl, preferably R'=ethyl and/or methyl,
X, X'=linear and/or branched alkylene or cycloalkylene radical having 1 to carbon atoms, preferably X, X'=alkylene radical having 1 to 4 carbon atoms,
R''=alkyl, cycloalkyl, aryl or aralkyl, it being possible for the carbon chain to be interrupted by nonadjacent oxygen, sulfur or NRa groups, where Ra=alkyl, cycloalkyl, aryl or aralkyl, preferably R''=alkyl radical, more particularly having 1 to 6 C atoms,
n=0 to 2, m=0 to 2, m+n=2, and x, y=0 to 2,
with the provisos that
(i) component (B1) is used in an amount such that the binder fraction of the isocyanate-group-containing parent structure of component (B1) is between 5% and 45% by weight, based in each case on the sum of the binder fraction of the isocyanate-group-containing parent structure of component (B1) plus the binder fraction of the isocyanate-group-containing parent structure of component (B2),
and
(ii) the mixture of components (B1) plus (B2) includes structural units (I) and structural units (II).

The present invention further provides multistage coating processes using these coating material compositions, and also the use of the coating material compositions as clearcoat and application of the coating process for automotive OEM finishing, for automotive refinishing and/or for the coating of parts for installation in or on motor vehicles, of plastics substrates and/or of utility vehicles.

It is surprising and was not foreseeable that the coating material compositions lead to coatings which are scratch-resistant to a high degree and in particular exhibit high gloss retention after scratch exposure, but at the same time also ensure good sandability and good polishability of the resultant coatings.

In particular, the resultant coatings have a very good overall appearance. The overall appearance was assessed by measuring the surface profile of the applied and baked coating films by means of the Wave Scan method, which allows a measurement of the visible profile of paint film surfaces. This was done by measuring the intensity of the reflection ("waviness") by means of the "Wave Scan" instrument from Byk-Gardner, recording 1250 measurement points over a distance of 10 cm. The reflection is divided by the instrument into long-waviness ("long-wave"), i.e. the variance in light intensity for structures in the range from 0.6 to 10 mm, and short-waviness ("short-wave"), i.e. the variance in light intensity for structures in the range from 0.1 mm to 0.6 mm. For a good appearance, besides low long-wave measurement values for the resultant coatings, with very low film thicknesses, it is particularly low short-wave values, with a film thickness of around 40 µm, that are decisive.

Furthermore, the coating material compositions lead to a network which is weathering-stable to a high degree, and at the same time ensure high acid resistance of the coatings. Moreover, the coatings and paint systems, especially the clearcoats, can be produced even in film thicknesses>40 µm without stress cracks occurring. The coating materials, over and above this, meet the requirements typically imposed on the clearcoat in automotive OEM finishes and automotive refinishes.

Lastly, the new coating materials can be prepared easily and very reproducibly, and do not present any environmental problems during paint application.

The Coating Materials of the Invention

The coating materials of the invention are, in particular, thermally curable coating materials—that is, preferably, coating materials which are substantially free from radiation-curable unsaturated compounds, and more particularly are completely free from radiation-curable unsaturated compounds.

The Polyhydroxyl-Group-Containing Compound (A)

As polyhydroxyl-group-containing compound (A) it is possible to use all compounds known to the skilled person which have at least 2 hydroxyl groups per molecule and are oligomeric and/or polymeric. As component (A) it is also possible to use mixtures of different oligomeric and/or polymeric polyols.

The preferred oligomeric and/or polymeric polyols (A) have mass-average molecular weights Mw>500 daltons, measured by means of gel permeation chromatography (GPC) against a polystyrene standard, preferably of between 800 and 100 000 daltons, more particularly of between 1000 and 50 000 daltons.

Particularly preferred are polyester polyols, polyurethane polyols, polysiloxane polyols, polyacrylate polyols and/or polymethacrylate polyols, and also copolymers thereof, referred to below as polyacrylate polyols.

The polyols preferably have an OH number of 30 to 400 mg KOH/g, more particularly between 100 and 300 KOH/g. The hydroxyl number (OH number) indicates how many mg of potassium hydroxide are equivalent to the amount of acetic acid bound in acetylation by 1 g of substance. For the determination, the sample is boiled with acetic anhydride-pyridine and the resultant acid is titrated with potassium hydroxide solution (DIN 53240-2). In the case of pure poly(meth)acrylates, the OH number can also be determined with sufficient precision by calculation on the basis of the OH-functional monomers used.

The glass transition temperatures, measured by means of DSC measurements in accordance with DIN-EN-ISO 11357-2, of the polyols are preferably between −150 and 100° C., more preferably between −120° C. and 80° C.

Suitable polyester polyols are described in EP-A-0 994 117 and EP-A-1 273 640, for example. Polyurethane polyols are prepared preferably by reaction of polyester polyol prepolymers with suitable di- or polyisocyanates and are described in EP-A-1 273 640, for example. Suitable polysiloxane polyols are described in WO-A-01/09260, for example, it being possible to employ the polysiloxane polyols recited therein preferably in combination with further polyols, more particularly those having higher glass transition temperatures.

With very particular preference, component (A) comprises one or more polyacrylate polyols and/or polymethacrylate polyols. Together with the polyacrylate polyol(s) and/or polymethacrylate polyol(s), it is possible to use further oligomeric and/or polymeric polyhydroxyl-group-containing compounds, examples being polyester polyols, polyurethane polyols and polysiloxane polyols, more particularly polyester polyols.

The poly(meth)acrylate polyols that are especially preferred in accordance with the invention are generally copolymers and preferably have mass-average molecular weights Mw of between 1000 and 20 000 daltons, more particularly of between 1500 and 10 000 daltons, measured in each case by means of gel permeation chromatography (GPC) against a polystyrene standard.

The glass transition temperature of the copolymers is generally between −100 and 100° C., more particularly between −60 and <20° C. (measured by means of DSC measurements in accordance with DIN EN ISO 11357-2).

The poly(meth)acrylate polyols preferably have an OH number of 60 to 300 mg KOH/g, more particularly between 70 and 200 KOH/g, and also an acid number of between 0 and 30 mg KOH/g.

The hydroxyl number (OH number) is determined as described above (DIN 53240-2). The acid number here indicates the number of mg of potassium hydroxide consumed in the neutralization of 1 g of the compound in question (DIN EN ISO 2114).

As hydroxyl-containing monomer units it is preferred to use hydroxyalkyl acrylates and/or hydroxyalkyl methacrylates, such as, more particularly, 2-hydroxyethyl acrylate, 2-hydroxyethyl methacrylate, 2-hydroxypropyl acrylate, 2-hydroxypropyl methacrylate, 3-hydroxypropyl acrylate, 3-hydroxypropyl methacrylate, 3-hydroxybutyl acrylate, 3-hydroxybutyl methacrylate and, more particularly, 4-hydroxybutyl acrylate and/or 4-hydroxybutyl methacrylate.

As further monomer units for the poly(meth)acrylate polyols it is preferred to use alkyl acrylates and/or alkyl methacrylates, such as preferably ethyl acrylate, ethyl methacrylate, propyl acrylate, propyl methacrylate, isopropyl acrylate, isopropyl methacrylate, butyl acrylate, butyl methacrylate, isobutyl acrylate, isobutyl methacrylate, tert-butyl acrylate, tert-butyl methacrylate, amyl acrylate, amyl methacrylate, hexyl acrylate, hexyl methacrylate, ethylhexyl acrylate, ethylhexyl methacrylate, 3,3,5-trimethylhexyl acrylate, 3,3,5-trimethylhexyl methacrylate, stearyl acrylate, stearyl methacrylate, lauryl acrylate or lauryl methacrylate, cycloalkyl acrylates and/or cycloalkyl methacrylates, such as cyclopentyl acrylate, cyclopentyl methacrylate, isobornyl acrylate, isobornyl methacrylate or, more particularly, cyclohexyl acrylate and/or cyclohexyl methacrylate.

As further monomer units for the poly(meth)acrylate polyols it is possible to use vinylaromatic hydrocarbons, such as vinyltoluene, alpha-methylstyrene or, more particularly, styrene, amides or nitriles of acrylic or methacrylic acid, vinyl esters or vinyl ethers, and also, in minor amounts, more particularly, acrylic and/or methacrylic acid.

Hydroxyl-Containing Compounds (C)

The coating material compositions of the invention may optionally comprise, in addition to the polyhydroxyl-group-containing component (A), one or more monomeric hydroxyl-containing compounds (C) which are different from component (A). These compounds (C) preferably account for a fraction of 0% to 20% by weight, more preferably of 0% to 10% by weight, very preferably of 1% to 5% by weight, based in each case on the binder fraction of the coating material composition.

As hydroxyl-containing compound (C), low molecular mass polyols are used.

Low molecular mass polyols used are, for example, diols, such as preferably ethylene glycol, neopentyl glycol, 1,2-propanediol, 2,2-dimethyl-1,3-propanediol, 1,4-butanediol, 1,3-butanediol, 1,5-pentanediol, 2,2,4-trimethyl-1,3-pentanediol, 1,6-hexanediol, 1,4-cyclohexanedimethanol and 1,2-cyclohexanedimethanol, and also polyols, such as preferably trimethylolethane, trimethylolpropane, trimethylolhexane, 1,2,4-butanetriol, pentaerythritol and dipentaerythritol. Such low molecular mass polyols are preferably admixed in minor fractions to the polyol component (A).

The Combination of Component (B1) and Component (B2)

The Acyclic, Aliphatic Polyisocyanate Component (B2)

It is essential to the invention that the coating materials comprise at least one polyisocyanate-group-containing compound (B2), different from component (B1), which has free or blocked isocyanate groups and has an acyclic, aliphatic polyisocyanate parent structure and/or a polyisocyanate parent structure derived from one such acyclic aliphatic polyisocyanate by trimerization, dimerization, urethane formation, biuret formation, uretdione formation and/or allophanate formation.

The acyclic aliphatic polyisocyanates serving as parent structures for the polyisocyanate-group-containing compounds (B2) used in accordance with the invention are preferably conventional substituted or unsubstituted aliphatic polyisocyanates. Examples of preferred polyisocyanates (B2) are tetramethylene 1,4-diisocyanate, hexamethylene 1,6-diisocyanate, 2,2,4-trimethylhexane 1,6-diisocyanate, ethylene diisocyanate, 1,12-dodecane diisocyanate and mixtures of the aforementioned polyisocyanates.

Additionally preferred polyisocyanate parent structures for component (B2) are the polyisocyanates derived from one such acyclic aliphatic polyisocyanate by trimerization, dimerization, urethane formation, biuret formation, uretdione formation and/or allophanate formation, more particularly the biuret dimer and/or the allophanate dimer and/or the isocyanurate trimer. In a further embodiment of the invention, the polyisocyanate parent structures for component (B2) are polyisocyanate prepolymers having urethane structural units that are obtained by reacting polyols with a stoichiometric excess of aforementioned acyclic aliphatic polyisocyanates. Polyisocyanate prepolymers of this kind are described in U.S. Pat. No. 4,598,131, for example.

Particularly preferred polyisocyanate parent structures for component (B2) are hexamethylene diisocyanate and/or its biuret dimer and/or allophanate dimer and/or isocyanurate trimer and/or its uretdione, and also mixtures of the stated polyisocyanate parent structures.

Especially preferred polyisocyanate parent structures for component (B2) are hexamethylene diisocyanate and/or its isocyanurate trimer, optionally together with its uretdione.

The acyclic aliphatic polyisocyanates and/or their polyisocyanates derived by trimerization, dimerization, urethane formation, biuret formation, uretdione formation and/or allophanate formation that are employed as component (B2) may additionally comprise at least one structural unit (I) of the formula (I)

  (I), and/or at least one structural unit of the formula (II)

  (II), where
R=hydrogen, alkyl, cycloalkyl, aryl or aralkyl, it being possible for the carbon chain to be interrupted by nonadjacent oxygen, sulfur or NRa groups, where Ra=alkyl, cycloalkyl, aryl or aralkyl,
R'=hydrogen, alkyl or cycloalkyl it being possible for the carbon chain to be interrupted by nonadjacent oxygen, sulfur or NRa groups, where Ra=alkyl, cycloalkyl, aryl or aralkyl, preferably R'=ethyl and/or methyl,
X, X'=linear and/or branched alkylene or cycloalkylene radical having 1 to carbon atoms, preferably X, X'=alkylene radical having 1 to 4 carbon atoms,
R"=alkyl, cycloalkyl, aryl or aralkyl, it being possible for the carbon chain to be interrupted by nonadjacent oxygen, sulfur or NRa groups, where Ra=alkyl, cycloalkyl, aryl or aralkyl, preferably R"=alkyl radical, more particularly having 1 to 6 C atoms,
n=0 to 2, m=0 to 2, m+n=2, and x, y=0 to 2.

As component (B2) it is preferred to use acyclic aliphatic polyisocyanates having free or blocked isocyanate groups, and/or their polyisocyanates having free or blocked isocyanate groups that are derived by trimerization, dimerization, urethane formation, biuret formation and/or allophanate formation, that include at least one structural unit (I) of the formula (I) and at least one structural unit of the formula (II).

The respective preferred alkoxy radicals (OR') may be the same or different—what is critical for the structure of the radicals, however, is to what extent they influence the reactivity of the hydrolyzable silane groups. Preferably R' is an alkyl radical, more particularly having 1 to 6 C atoms. Particularly preferred are radicals R' which raise the reactivity of the silane groups, i.e. represent good leaving groups. Accordingly, a methoxy radical is preferred over an ethoxy radical, which is in turn preferred over a propoxy radical. With particular preference, therefore, R'=ethyl and/or methyl, more particularly methyl.

The reactivity of organofunctional silanes may also, moreover, be influenced considerably by the length of the spacers X, X" between silane functionality and organic functional groups used for reaction with the constituent that is to be modified. As an example of this, mention may be made of the "alpha"-silanes, which are available from Wacker, and in which there is a methylene group, rather than the propylene group present in the case of "gamma"-silanes, between Si atom and functional group.

The components (B2) functionalized with the structural units (I) and/or (II), and used with preference in accordance with the invention, are obtained in particular by reacting acyclic aliphatic polyisocyanates and/or their polyisocyanates derived by trimerization, dimerization, urethane formation, biuret formation, uretdione formation and/or allophanate formation with at least one compound of the formula (Ia)

  (Ia), and/or with at least one compound of formula (IIa)

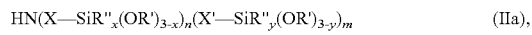  (IIa), the substituents having the definition stated above.

The components (B2) functionalized with the structural units (I) and (II) that are used with particular preference in accordance with the invention are obtained with particular preference by reacting
acyclic aliphatic polyisocyanates and/or their polyisocyanates derived by trimerization, dimerization, urethane formation, biuret formation, uretdione formation and/or allophanate formation with at least one compound of the formula (Ia) and with at least one compound of the formula (IIa), the substituents having the definition stated above.

Compounds (IIa) preferred in accordance with the invention are bis(2-ethyltrimethoxysilyl)amine, bis(3-propyltrimethoxysilyl)amine, bis(4-butyltrimethoxysilyl)amine, bis(2-ethyltriethoxysilyl)amine, bis(3-propyltriethoxysilyl)amine and/or bis(4-butyltriethoxysilyl)amine. Especially preferred is bis(3-propyltrimethoxysilyl)amine. Aminosilanes of this kind are available, for example, under the brand name DYNASYLAN® from DEGUSSA or Silquest® from OSI.

Compounds (Ia) preferred in accordance with the invention are amino-alkyltrialkoxysilanes, such as preferably 2-aminoethyltrimethoxysilane, 2-aminoethyltriethoxysilane, 3-aminopropyltrimethoxysilane, 3-aminopropyl-triethoxysilane, 4-aminobutyltrimethoxysilane, 4-aminobutyltriethoxysilane. Particularly preferred compounds (Ia) are N-(2-(trimethoxysilyl)ethyl)alkylamines, N-(3-(trimethoxysilyl)propyl)alkylamines, N-(4-(trimethoxysilyl)-butyl) alkylamines, N-(2-(triethoxysilyl)ethyl)alkylamines, N-(3-(triethoxy-silyl)propyl)alkylamines and/or N-(4-(triethoxysilyl)butyl)alkylamines. Especially preferred is N-(3-(trimethoxysilyl)propyl)butylamine. Aminosilanes of this kind are available, for example, under the brand name DYNASYLAN® from DEGUSSA or Silquest® from OSI.

In component (B2) preferably between 10 and 90 mol %, more preferably between 20 and 80 mol % and very preferably between 30 and 70 mol % of the isocyanate groups originally present have undergone reaction to form structural units (I) and/or (II), preferably structural units (I) and (II).

The Cycloaliphatic Polyisocyanate Component (B1)

It is essential to the invention that the coating materials comprise at least one polyisocyanate-group-containing compound (B1) having free or blocked isocyanate groups and having a cycloaliphatic polyisocyanate parent structure and/or a polyisocyanate parent structure derived from one such cycloaliphatic polyisocyanate by trimerization, dimerization, urethane formation, biuret formation, uretdione formation and/or allophanate formation.

The cycloaliphatic polyisocyanates used as parent structures for the polyisocyanate-group-containing compounds (B1) used in accordance with the invention are preferably conventional substituted or unsubstituted cycloaliphatic polyisocyanates. Examples of preferred polyisocyanates (B1) are isophorone diisocyanate, cyclobutane 1,3-diisocyanate, cyclohexane 1,3-diisocyanate, cyclohexane 1,4-diisocyanate, methylcyclohexyl diisocyanates, hexahydrotoluene 2,4-diisocyanate, hexahydrotoluene 2,6-diisocyanate, hexahydrophenylene 1,3-diisocyanate, hexahydrophenylene 1,4-diisocyanate, perhydrodiphenylmethane 2,4'-diisocyanate, 4,4'-methylenedicyclohexyl diisocyanate (e.g. Desmodur® W from Bayer AG) and mixtures of the aforementioned polyisocyanates.

Additionally preferred polyisocyanate parent structures for component (B1) are the polyisocyanates derived from one such cycloaliphatic polyisocyanate by trimerization, dimerization, urethane formation, biuret formation, uretdione formation and/or allophanate formation, more particularly the biuret dimer and/or the allophanate dimer and/or the isocyanurate trimer. In a further embodiment of the invention, the polyisocyanate parent structures for component (B1) are polyisocyanate prepolymers having urethane structural units that are obtained by reacting polyols with a stoichiometric excess of aforementioned cycloaliphatic polyisocyanates. Polyisocyanate prepolymers of this kind are described in U.S. Pat. No. 4,598,131, for example.

Particularly preferred cycloaliphatic polyisocyanates (B1) are isophorone diisocyanate and 4,4'-methylenedicyclohexyl diisocyanate and/or their biuret dimers and/or their allophanate dimers and/or their isocyanurate trimers.

The cycloaliphatic polyisocyanates used as component (B1) and/or their polyisocyanates derived by trimerization, dimerization, urethane formation, biuret formation, uretdione formation and/or allophanate formation may further comprise at least one structural unit (I) of the formula (I) and/or at least one structural unit of the formula (II).

The components (B1) functionalized with the structural units (I) and/or (II) are obtained preferably by reacting cycloaliphatic polyisocyanates and/or their polyisocyanates derived by trimerization, dimerization, urethane formation, biuret formation, uretdione formation and/or allophanate formation with at least one compound of the formula (Ia)

$$H\text{—}NR\text{—}(X\text{—}SiR''_x(OR')_{3-x}) \qquad (Ia),$$

and/or with at least one compound of the formula (IIa)

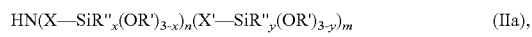

$$HN(X\text{—}SiR''_x(OR')_{3-x})_n(X'\text{—}SiR''_y(OR')_{3-y})_m \qquad (IIa),$$

the substituents having the definition stated above.

In component (B1) preferably 0 to 34 mol %, preferably less than 5.0 mol %, more preferably less than 2.5 mol % and very preferably none of the isocyanate groups originally present have undergone reaction to form structural units (I) and/or structural units (II).

It is essential to the invention that the mixture of components (B1) plus (B2) includes structural units (I) and structural units (II). If, therefore, component (B1) contains only structural units (I), but no structural units (II), then component (B2) necessarily contains structural units (II) and also, optionally, structural units (I) as well. If component (B1) contains only structural units (II), but no structural units (I), then component (B2) necessarily contains structural units (I) and also, optionally, structural units (II) as well.

If, therefore, component (B2) contains only structural units (I), but no structural units (II), then component (B1) necessarily contains structural units (II) and also, optionally, structural units (I) as well. If component (B2) contains only structural units (II), but no structural units (I), then component (B1) necessarily contains structural units (I) and also, optionally, structural units (II) as well.

Preferred coating material compositions are obtained when the total amount of structural units (I) in the mixture of component (B1) plus component (B2) is between 3 and 90 mol %, preferably between 5 and 70 mol %, more preferably between 10 and 50 mol %, very preferably between 10 and 40 mol %, based in each case on the entirety of the structural units (I) plus (II), and the total amount of structural units (II) in the mixture of component (B1) plus component (B2) is between 97 and 10 mol %, preferably between 95 and 30 mol %, more preferably between 90 and 50 mol % and very preferably between 90 and 60 mol %, based in each case on the entirety of the structural units (I) plus (II).

Preferably, in the mixture of the polyisocyanate component (B1) plus the polyisocyanate component (B2), between 10 and 80 mol %, preferably between 20 and 70 mol %, more preferably between 25 and less than 50 mol % and very preferably between 31 and 45 mol % of the isocyanate groups originally present in (B1) plus (B2) have undergone reaction to form structural units (I) and/or (II), preferably structural units (I) and (II).

Component (B1) is used in an amount such that the binder fraction of the isocyanate-group-containing parent structure of component (B1) is between 5% and 45% by weight, preferably between 10% and 40% by weight and more preferably between 15% and 35% by weight, based in each case on the sum of the binder fraction of the isocyanate-group-containing parent structure of component (B1) plus the binder fraction of the isocyanate-group-containing parent structure of component (B2).

Particularly preferred coating material compositions are obtained if, in the mixture of component (B1) plus component (B2), the total amount of structural units (I) is between 10 and 50 mol % and the total amount of structural units (II) is between 90 and 50 mol %, based in each case on the entirety of the structural units (I) plus (II),
and
between 25 and less than 50 mol % of the isocyanate groups originally present in (B1) plus (B2) have undergone reaction to form structural units (I) and (II)
and
component (B1) is used in an amount such that the binder fraction of the isocyanate-group-containing parent structure of component (B1) is between 15% and 35% by weight, based in each case on the sum of the binder fraction of the isocyanate-group-containing parent structure of component (B1) plus the binder fraction of the isocyanate-group-containing parent structure of component (B2).

In a further embodiment of the invention, the polyhydroxyl-group-containing compound (A), in addition to the hydroxyl groups, includes structural units of the formula (I) and/or of the formula (II).

Structural units of the formula (I) can be introduced into the compound (A) by incorporation of monomer units having such structural units or by reaction of polyols having further functional groups with a compound of the formula (Ia), the substituents having the definition stated above. Structural units of the formula (II), analogously, can be introduced into the compound (A) by incorporation of monomer units having such structural units or by reaction of polyols which have further functional groups with a compound of the formula (IIa), the substituents having the definition stated above. For the reaction of the polyol with the compound (Ia) and/or (IIa), accordingly, said polyol has further functional groups which react with the secondary amino group of the compound (Ia) and/or (IIa), such as, more particularly, acid groups or epoxy groups.

Monomer building blocks which carry the structural elements (I) and/or (II) are preferably reaction products of acrylic acid and/or of methacrylic acid or of epoxy-group-containing alkyl acrylates and/or methacrylates with the abovementioned compounds (Ia) and/or (IIa).

Suitable polyhydroxyl-group-containing compounds (A) having structural units of the formula (I) and/or of the formula (II) are also described in WO 08/74489 at page 21 line 21 to page 23 line 18.

Catalyst (D)

The coating material compositions of the invention preferably comprise at least one catalyst (D) for the crosslinking of the silane groups. Examples are metal complexes with chelate ligands based on zinc or aluminum, such as the Lewis acids or titanates described in WO 05/03340, for example, but in selecting the catalysts it must be ensured that they do not lead to yellowing of the coating materials. Moreover, certain catalysts it is known to use are less desirable, on toxicological grounds.

It is therefore preferred, as catalyst (D), to use phosphorus-containing, more particularly phosphorus-containing and nitrogen-containing, catalysts. In this context it is also possible to use mixtures of two or more different catalysts (D).

Examples of suitable phosphorus-containing catalysts (D) are substituted phosphonic diesters and diphosphonic diesters, preferably from the group consisting of acyclic phosphonic diesters, cyclic phosphonic diesters, acyclic diphosphonic diesters and cyclic diphosphonic diesters. Catalysts of this kind are described in German Patent Application DE-A-102005045228, for example.

More particularly, however, substituted phosphoric monoesters and phosphoric diesters are used, preferably from the group consisting of acyclic phosphoric diesters and cyclic phosphoric diesters, more preferably amine adducts of phosphoric monoesters and diesters.

Used with especial preference as catalyst (D) are the corresponding amine-blocked phosphoric esters, and, of these, more particularly amine-blocked ethylhexyl phosphates and amine-blocked phenyl phosphates, especially preferably amine-blocked phosphoric acid bis(2-ethylhexyl) esters.

Examples of amines with which the phosphoric esters are blocked are, in particular, tertiary amines, examples being bicyclic amines, such as diazabicyclooctane (DABCO), diazabicyclononene (DBN), diazabicycloundecene (DBU), dimethyldodecylamine or triethylamine, for example. Particularly preferred for blocking the phosphoric esters is the use of tertiary amines, which ensure high activity of the catalyst at the curing conditions of 140° C.

Certain amine-blocked phosphoric acid catalysts are also available commercially (e.g. Nacure products from King Industries). An example that may be mentioned is that with the designation Nacure 4167 from King Industries, as a particularly suitable catalyst based on an amine-blocked phosphoric acid partial ester.

The catalysts are used preferably in fractions of 0.01% to 20% by weight, more preferably in fractions of 0.1% to 10% by weight, based on the binder fraction of the coating material composition of the invention. A lower level of activity on the part of the catalyst may be partially compensated by correspondingly higher quantities employed.

The coating material compositions of the invention may further comprise another amine catalyst based on a bicyclic amine, more particularly on an unsaturated bicyclic amine. Examples of suitable amine catalysts are 1,5-diazabicyclo [4.3.0]non-5-ene or 1,8-diazabicyclo[5.4.0]undec-7-ene.

These amine catalysts are used preferably in fractions of 0.01% to 20% by weight, more preferably in fractions of 0.1% to 10% by weight, based on the binder fraction of the coating material composition of the invention.

Rheological Assistant (R) Based on Fumed Silica

It is essential to the invention that the coating material composition of the invention comprises at least one rheological assistant (R) based on fumed silica.

The rheological assistants (R) based on fumed silicas generally have a chainlike structure and are agglomerates or aggregates of silicon dioxide primary particles. These rheological assistants are obtained in particular by flame hydrolysis of silicon halogen compounds. Rheological assistants of these kinds are available commercially, for example, under the Aerosil® designation from Evonik Degussa.

As the skilled person is aware, through suitable reaction conditions during the flame hydrolysis and surface modifications to the primary silicon dioxide particles, it is possible to vary the parameters and hence also the properties of the fumed silica particles in a controlled way.

For example, a part is played by the primary particle size of the silicon dioxide particles, since in general the tendency to form agglomerates goes down as the primary particle size goes up. Furthermore, of course, a small primary particle size implies a high specific surface area.

Moreover, a distinction is made in particular between rheological assistants (R1) based on hydrophilic silicas and rheological assistants (R2) based on hydrophobic silicas. Generally speaking, rheological assistants (R1) based on hydrophilic silicas have a greater effect on the rheology of the coating material composition.

As rheological assistant (R) in accordance with the invention it is possible to use either at least one rheological assistant (R1) based on hydrophilic silicas or at least one rheological assistant (R2) based on hydrophobic silicas, or a mixture of at least one rheological assistant (R1) based on hydrophilic silicas and at least one rheological assistant (R2) based on hydrophobic silicas.

The fumed silica produced by means of flame hydrolysis has various functional groups on its surface, especially silanol groups and siloxane groups. It is therefore hydrophilic as such and can be used without further modification to its surface as rheological assistant (R1), i.e. these rheological assistants (R1) consist preferably of fumed silica.

In the coating materials it is also possible to use fumed silicas whose surface has been modified with monomeric or oligomeric compounds. Surface modification is typically accomplished by attachment of the groups located on the silica surface, such as silanol groups, for example, to monomeric or oligomeric compounds. These monomeric or oligomeric compounds therefore contain at least one group which has affinity for the groups located on the particle surface. The attachment may be accomplished, for example, by covalent bonding, ionic attachment or physisorption. The part of the monomeric or oligomeric compounds that is not needed for attachment to the silica particle surface protrudes preferably wholly or partly into the medium surrounding the particles.

The monomeric or oligomeric compounds that are used for surface modification may contain further functional groups in addition to the group required for attachment to the surface of the silica particles, these further functional groups being able, for example, to react with the binder component (A). A surface modification of this kind is accomplished for example by addition of hydrolyzable silanes which further carry at least one additional functional group to the silica particles.

Examples of hydrolyzable silanes suitable for the surface modification of the particles include those silanes which, as a group reactive toward the binder (A) and/or toward the crosslinking agents (B1) and/or (B2), comprise a glycidyl group, an amino group, a hydroxyl group or a mercapto group.

For surface modification, however, it is preferred in accordance with the invention to use monomeric or oligomeric compounds which as well as the group that is reactive toward silanol groups have one or more hydrophobic radicals and so are associated with a hydrophobicizing of the silica particles and therefore serve to produce the rheological assistants (R2) based on hydrophobic silicas. For modifying the silica it is preferred to use organofunctional silicon compounds having at least one alkyl group with 1 to 50 C atoms, more particularly with 1 to 10 C atoms, and with at least one hydrolyzable group, and/or with at least one OH and/or NH group. Examples of such compounds are alkylalkoxysilanes, more particularly dialkyldialkoxysilanes and alkyltrialkoxysilanes, alkylhalosilanes, more particularly alkylchlorosilanes, preferably trialkylchlorosilanes and dialkyldichlorosilanes, alkylpolysiloxanes, dialkylpolysiloxanes, and alkyldisilazanes and the like.

As rheological assistants (R2) based on hydrophobic silicas it is particularly preferred here to use silanized, pyrogenically prepared silicas which have monomethylsilyl groups and/or dimethylsilyl groups and/or trimethylsilyl groups fixed on the surface. These rheological assistants (R2) used with particular preference can be prepared for example by surface-modifying a pyrogenically prepared silicon dioxide with trimethylchlorosilane and/or dimethyldichlorosilane and/or monomethyltrichlorosilane.

In principle there is an increase in the rheology control effect both of the rheological assistants (R1) based on hydrophilic silica and in the rheology control effect both of the rheological assistants (R2) based on hydrophobic silica as the primary particle size goes down. Both the rheological assistants (R1) based on hydrophilic silicas that are used in accordance with the invention and the rheological assistants (R2) based on hydrophobic silicas, therefore, typically have a primary particle size of <50 nm.

In the coating material compositions of the invention it is therefore preferred to use not only rheological assistants (R1) based on hydrophilic silica but also rheological assistants (R2) based on hydrophobic silica, having an internal BET surface area of more than 100 $m^2/g$, more particularly have an internal BET surface area of more than 200 $m^2/g$.

Examples of suitable rheological assistants (R1) based on hydrophilic silicas are also the customary and known products which are available commercially and are sold, for example, by Degussa Evonik under the brand name Aerosil® 380, Aerosil® 300, Aerosil® 200, Aerosil® 150 and Aerosil® 130, or by Wacker under the type designation T 40, with Aerosil® 380 being used in particular.

Examples of rheological assistants (R2) based on hydrophobic silicas are customary and known products as sold, for example, by Degussa Evonik under the brand name Aerosil®, more particularly Aerosil® R816, R711, 8200, R106, R972, R974, R805, R812, or R812S, or by Wacker under the brand name or type designation HDK, more particularly HDK H 15, H 18, H 20, H 30 or 2000.

In the coating material, the rheological assistants (R) and/or (R1) and/or (R2) are preferably used in dispersion in at least part of the binder (A) or—if two or more different binders (A) are used in the coating material of the invention—in dispersion in at least part of at least one binder (A).

The rheological assistant (R) is used preferably in fractions of 0.01% to 10% by weight, more preferably in fractions of 0.5% to 5.0% by weight, based on the binder fraction of the coating material composition of the invention. Where two or more different rheological assistants (R) are used, the total amount of all of these rheological assistants (R) is between 0.01% and 10% by weight, more preferably between 0.5% and 5.0% by weight, based on the binder fraction of the coating material composition of the invention. Where as rheological assistant (R) use is made of a mixture of at least one rheological assistant (R1) based on hydrophilic silicas and at least one rheological assistant (R2) based on hydrophobic silicas, the total amount of these rheological assistants (R1) plus (R2) is between 0.01% and 10% by weight, more preferably between 0.5% and 5.0% by weight, based on the binder friction of the coating material composition of the invention.

The Combination of Components (A), (B1), (B2), Optionally (C), D) and (R) and Also Further Components of the Coating Material Compositions Where the coating material compositions are one-component compositions, polyisocyanate-group-containing compounds (B1) and (B2) are selected whose free isocyanate groups are blocked with blocking agents. For example, the isocyanate groups may be blocked with substituted pyrazoles, more particularly with alkyl-substituted pyrazoles, such as 3-methylpyrazole, 3,5-dimethylpyrazole, 4-nitro-3,5-dimethylpyrazole, 4-bromo-3,5-dimethylpyrazole and the like. With particular preference, the isocyanate groups of components (B1) and (B2) are blocked with 3,5-dimethylpyrazole.

In the case of the 2-component coating material compositions particularly preferred in accordance with the invention, shortly before the coating material is applied, one coatings component, comprising the polyhydroxyl-group-containing compound (A) and also further components, described below, is mixed with a further coatings component, comprising the polyisocyanate-group-containing compounds (B1) and (B2) and also, optionally, further of the components described below, mixing taking place in a conventional way, with, generally speaking, the coatings component that comprises the compound (A) comprising the catalyst (D) and also part of the solvent.

The polyhydroxyl-group-containing component (A) may be present in a suitable solvent. Suitable solvents are those which allow sufficient solubility of the polyhydroxyl-group-containing component.

In accordance with the invention it is preferred to use coating material compositions which comprise from 20% to 79.98% by weight, preferably from 30% to 69.4% by weight, based in each case on the binder fraction of the coating material composition, of at least one polyhydroxyl-group-containing compound (A), more particularly of at least one polyhydroxyl-group-containing polyacrylate (A) and/or of at least one polyhydroxyl-group-containing polymethacrylate (A).

In accordance with the invention it is preferred to use coating material compositions which comprise from 79.98% to 20% by weight, preferably from 69.4% to 30% by weight, based in each case on the binder fraction of the coating material composition, of the mixture comprising at least one polyisocyanate component (B1) plus at least one polyisocyanate component (B2).

The coating material compositions preferably comprise the compounds (C) in a fraction of 0% to 20% by weight, more preferably of 0% to 10% by weight, very preferably of 1% to 5% by weight, based in each case on the binder fraction of the coating material composition.

The weight fractions of the polyol (A) and optionally (C) and of the polyisocyanates (B1) and (B2) are preferably selected such that the molar equivalents ratio of the hydroxyl groups of the polyhydroxyl-group-containing compound (A) plus optionally (C) to the isocyanate groups of components (B1) plus (B2) is between 1:0.5 and 1:1.5, preferably between 1:0.8 and 1:1.2, more preferably between 1:0.9 and 1:1.1.

The polyhydroxyl-group-containing component (A), the polyhydroxyl component (C) and/or the polyisocyanate component (B1) and/or (B2) may be present in a suitable solvent.

Solvents (L) suitable for the coating materials of the invention are especially those which in the coating material are chemically inert towards the compounds (A), (B1), (B2) and optionally (C) and which also do not react with (A), optionally (C), (B1) and (B2) during the curing of the coating material. Examples of such solvents are aliphatic and/or aromatic hydrocarbons such as toluene, xylene, solvent naphtha, Solvesso 100 or Hydrosol® (ARAL), ketones, such as acetone, methyl ethyl ketone or methyl amyl ketone, esters, such as ethyl acetate, butyl acetate, pentyl acetate or ethyl ethoxypropionate, ethers, or mixtures of the aforesaid solvents. The aprotic solvents or solvent mixtures preferably have a water content of not more than 1% by weight, more preferably not more than 0.5% by weight, based on the solvent.

The solvent or solvents are used in the coating material compositions of the invention preferably in an amount such that the binder content of the coating material composition is at least 50% by weight, more preferably at least 60% by weight. It should be taken into account here that in general the viscosity of the coating material composition increases with higher solids content, and the leveling of the coating material composition and hence the overall appearance of the cured coating become poorer.

Besides the compounds (A), (B1), (B2) and optionally (C) it is also possible for further binders (E) to be used, which are able preferably to react and form network nodes with the hydroxyl groups of the poly(meth)acrylate (A) and/or with the free isocyanate groups of the compound (B) and/or with the alkoxysilyl groups of the compounds (B).

As component (E) it is possible for example to use amino resins and/or epoxy resins. The customary and known amino resins are contemplated, some of whose methylol and/or methoxymethyl groups may have been defunctionalized by means of carbamate or allophanate groups. Crosslinking agents of this kind are described in patent specifications U.S. Pat. No. 4,710,542 and EP-B-0 245 700 and also in the article by B. Singh and co-workers, "Carbamylmethylated Melamines, Novel Crosslinkers for the Coatings Industry" in Advanced Organic Coatings Science and Technology Series, 1991, volume 13, pages 193 to 207.

Generally speaking, such components (E) are used in fractions of up to 40% by weight, preferably of up to 30% by weight, more preferably of up to 25% by weight, based on the binder fraction of the coating material composition of the invention.

The coating material composition of the invention further comprises the rheological assistant (R) in a total amount of 0.01% to 10% by weight, more preferably in a total amount of 0.5% to 5.0% by weight, based on the binder fraction of the coating material composition of the invention.

The binder mixture of the invention or the coating material composition of the invention may further comprise at least one customary and known coatings additive (F), which is different from components (a), (B), (C), (D) and (R), in effective amounts, i.e. in amounts preferably up to 30% by weight, more preferably up to 20% by weight and more particularly up to 10% by weight, based in each case on the binder fraction of the coating material composition.

Examples of suitable coatings additives (F) are as follows:
especially UV absorbers;
especially light stabilizers such as HALS compounds, benzotriazoles or oxalanilides;
free-radical scavengers;
slip additives;
polymerization inhibitors;
defoamers;
reactive diluents different from components (A) and (C), more particularly reactive diluents which become reactive only on reaction with further constituents and/or water, such as Incozol or aspartic esters, for example;
wetting agents different from components (A) and (C), such as siloxanes, fluorine-containing compounds, carboxylic monoesters, phosphoric esters, polyacrylic acids and copolymers thereof or polyurethanes;
adhesion promoters;
flow control agents;
film-forming auxiliaries such as cellulose derivatives;
fillers such as, for example, nanoparticles based on silicon dioxide, aluminum oxide or zirconium oxide; for further details, refer to Römpp Lexikon "Lacke and Druckfarben", Georg Thieme Verlag, Stuttgart, 1998, pages 250 to 252;
flame retardants.

Preferred here are coating material compositions which contain less than 7.5%, preferably less than 5.0%, more preferably less than 1.0%, by weight, based in each case on the binder fraction of the coating material composition of the invention and based on the binder fraction of the urea-based rheological agent, and in particular no urea-based rheological assistant at all.

Particularly preferred are coating material compositions which comprise 30% to 69.4% by weight, based on the binder fraction of the coating material composition, of at least one polyhydroxyl-group-containing polyacrylate (A) and/or at least one polyhydroxyl-group-containing polymethacrylate (A),
69.4% to 30% by weight, based on the binder fraction of the coating material composition, of the polyisocyanate-group-containing compounds (B1) plus (B2),
0% to 10% by weight, based on the binder fraction of the coating material composition, of the hydroxyl-containing component (C),
0.1% to 10% by weight, based on the binder fraction of the coating material composition of the invention, of at least one catalyst (D),
0.5% to 5% by weight, based on the binder fraction of the coating material composition of the invention, of at least one rheological assistant (R) based on fumed silica,
0% to 15% by weight, based on the binder fraction of the coating material composition, of one or more amino resins and/or one or more tris(alkoxycarbonylamino)triazines (E) and
0% to 20% by weight, based on the binder fraction of the coating material composition, of at least one customary and known coatings additive (F).

The binder fraction of the coating material composition is determined, prior to crosslinking, by weighing a small sample (P) of the coating material composition and subsequently determining its solids content by drying it at 130° C. for 60 minutes, cooling it and then weighing it again. The residue corresponds to the binder fraction of the sample (P). The binder fraction of the coating material composition, in % by weight, is then given, correspondingly, by 100 multiplied by the quotient formed from the weight of the residue of the sample (P) after drying at 130° C., divided by the weight of the sample (P) prior to drying.

The binder fraction of the individual components (A) or (B1) or (B2) or (C) of the coating material is determined analogously by weighing a small sample (P) of the respective component (A) or (B1) or (B2) or (C) and subsequently determining its solids content by drying it at 130° C. for 60 minutes, cooling it and then weighing it again. The binder fraction of the component in % by weight is then given, correspondingly, by 100 multiplied by the quotient formed from the weight of the residue of the respective sample (P) after drying at 130° C., divided by the weight of the respective sample (P) prior to drying.

In a further embodiment of the invention, the binder mixture of the invention or the coating material composition of the invention may further comprise additional pigments and/or fillers and may serve for the production of pigmented topcoats or pigmented undercoats or primer-surfacers, more particularly of pigmented topcoats. The pigments and/or fillers employed for these purposes are known to the skilled person. The pigments are used typically in an amount such that the pigment-to-binder ratio is between 0.05:1 and 1.5:1, based in each case on the binder fraction of the coating material composition.

Since the coatings of the invention produced from the coating materials of the invention adhere outstandingly even to already-cured electrocoats, primer-surfacer coats, basecoats or customary and known clearcoats, they are outstandingly suitable, in addition to their use in automotive OEM (production-line) finishing, for automotive refinishing and/or for the coating of parts for installation in or on motor vehicles, and/or for the coating of utility vehicles.

The application of the coating material compositions of the invention may take place by any of the customary application methods, such as, for example, spraying, knife-coating, spreading, pouring, dipping, impregnating, trickling or rolling. With respect to such application, the substrate to be coated may itself be at rest, with the application unit or equipment being moved. Alternatively, the substrate to be coated, more particularly a coil, may be moved, with the application unit being at rest relative to the substrate or being moved appropriately.

Preference is given to employing spray application methods, such as, for example, compressed air spraying, airless spraying, high speed rotation, electrostatic spray application (ESTA), alone or in conjunction with hot spray application such as hot air spraying, for example.

The curing of the applied coating materials of the invention may take place after a certain rest time. The rest time serves, for example, for the leveling and degassing of the coating films or for the evaporation of volatile constituents such as solvents. The rest time may be assisted and/or shortened through the application of elevated temperatures and/or through a reduced atmospheric humidity, provided that this does not entail any instances of damage to or change in the coating films, such as a premature complete crosslinking.

The thermal curing of the coating materials has no peculiarities in terms of method, but instead takes place in accordance with the customary and known methods, such as heating in a forced air oven or irradiation with IR lamps. This thermal curing may also take place in stages. Another preferred curing method is that of curing with near infrared (NIR radiation).

The thermal curing takes place advantageously at a temperature of 20 to 200° C., preferably 40 to 190° C. and more particularly 50 to 180° C., for a time of 1 min up to 10 h, preferably 2 min to 5 h and more particularly 3 min to 3 h, with longer cure times also being employable at low temperatures. For automotive refinishing and for the coating of plastics parts, and also for the coating of utility vehicles, relatively low temperatures are typically employed here, of preferably between 20 and 80° C., more particularly between 20 and 60° C.

The coating materials of the invention are outstandingly suitable as decorative, protective and/or effect coatings and finishes on bodywork of means of transport (especially motor vehicles, such as cycles, motorcycles, buses, lorries or cars) or of parts thereof; on the interior and exterior of edifices; on furniture, windows and doors; on plastics moldings, especially CDs and windows; on small industrial parts, on coils, containers and packaging; on white goods; on films; on optical, electrical and mechanical components; and also on hollow glassware and articles of everyday use.

The coating material compositions of the invention can therefore be applied, for example, to an uncoated or precoated substrate, the coating materials of the invention being either pigmented or unpigmented. The coating material compositions and paint systems of the invention in particular, more particularly the clearcoats, are employed in the technologically and aesthetically particularly demanding field of automotive OEM finishing and for the coating of plastics parts for installation in or on car bodies, more particularly for top-class car bodies, such as, for example, for producing roofs, hatches, bonnets, fenders, bumpers, spoilers, cills, protective strips, side trim and the like, and for the finishing of utility vehicles, such as, for example, of lorries, chain-driven construction vehicles, such as crane vehicles, wheel loaders and concrete mixers, buses, rail vehicles, watercraft, aircraft, and also agricultural equipment such as tractors and combines, and parts thereof, and also for automotive refinishing, with automotive refinishing encompassing not only the repair of the OEM finish on the line but also the repair of local defects, such as scratches, stone chip damage and the like, for example, and also complete recoating in corresponding repair workshops and car paint shops for the value enhancement of vehicles.

The plastics parts are typically composed of ASA, polycarbonates, blends of ASA and polycarbonates, polypropylene, polymethyl methacrylates or impact-modified polymethyl methacrylates, more particularly of blends of ASA and polycarbonates, preferably used with a polycarbonate fraction >40%, more particularly >50%.

ASA refers generally to impact-modified styrene/acrylonitrile polymers, in which graft copolymers of vinylaromatic compounds, more particularly styrene and of vinyl cyanides, more particularly acrylonitrile, are present on polyalkyl acrylate rubbers in a copolymer matrix of, in particular, styrene and acrylonitrile.

With particular preference, the coating material compositions of the invention are used in multistage coating processes, more particularly in processes in which an optionally precoated substrate is coated first with a pigmented basecoat film and then with a film with the coating material composition of the invention. The invention accordingly also provides multicoat color and/or effect finishes comprising at least one pigmented basecoat and at least one clearcoat applied thereon, these finishes being characterized in that the clearcoat has been produced from the coating material composition of the invention.

Not only water-thinnable basecoats but also basecoats based on organic solvents can be used. Suitable basecoats are described in, for example, EP-A-0 692 007 and in the documents listed therein at column 3 lines 50 et seq. Preferably, the applied basecoat is first dried—that is, in an evaporation phase, at least some of the organic solvent and/or of the water is removed from the basecoat film. Drying takes place preferably at temperatures from room temperature to 80° C. After drying has taken place, the coating material composition of the invention is applied. The two-coat finish is subsequently baked, preferably under conditions employed in automotive OEM finishing, at temperatures from 20 to 200° C. for a time of 1 min up to 10 h; in the case of the temperatures employed for automotive refinishing, which in general are between 20 and 80° C., more particularly between 20 and 60° C., longer cure times may also be employed.

In another preferred embodiment of the invention, the coating material composition of the invention is used as a transparent clearcoat for the coating of plastics substrates, particularly of plastics parts for interior or exterior installation. These plastics parts for interior or exterior installation are preferably coated likewise in a multistage coating process, in which an optionally precoated substrate or a substrate which has been pretreated for enhanced adhesion of the subsequent coatings (by means, for example, of flaming, corona treatment or plasma treatment) is coated first with a pigmented basecoat film and thereafter with a film with the coating material composition of the invention.

Examples

Preparation Example for the Curative System VB2-1, Used in the Comparative Examples, Based on the Isocyanurate of Hexamethylene Diisocyanate (Degree of Silanization Based on NCO Molar: 34 Mol %, Molar Ratio of the Structural Units (I) to the Structural Units (II)=50:50)

In a reaction vessel, 33.5 parts by weight of trimerized hexamethyl 1,6-diisocyanate (Desmodur® N3300, Bayer, Leverkusen) and 28 parts by weight of butyl acetate are introduced. With reflux cooling, nitrogen blanketing and stirring, a mixture of 7.0 parts by weight of N-[3-(trimethoxysilyl)propyl]butylamine (Dynasylan® 1189, EVONIK, Rheinfelden) and 10.0 parts by weight of bis[3-trimethoxysilylpropyl]amine (Dynasylan® 1124, EVONIK, Rheinfelden) is added dropwise at a rate such that a temperature of 50-60° C. is not exceeded. The reaction mixture is stirred until the NCO value, determined by means of titration, has reached the theoretically calculated NCO value of 6.1% by weight. The resulting mixture has a theoretical binder content of 64% by weight.

Preparation Example for the Curative System (B1-1) Plus (B2-1), Used in Inventive Examples B1 to B3 (Molar Ratio of the Structural Units (I) to the Structural Units (II) in the Compound (B2-1)=50:50, a Degree of Silanization of the Compound (B2-1) of 41 Mol %, Corresponding to a Degree of Silanization, Based on the Isocyanate Groups Originally Present in Compound (B1-1) Plus Compound (B2-1), of 34 Mol %, and a Binder Fraction of the Polyisocyanate Parent Structure of Component (B1-1) of 20% by Weight, Based on the Sum of the Binder Fraction of the Polyisocyanate Parent Structure of Component (B1-1) and the Binder Fraction of the Polyisocyanate Parent Structure of Component (B2-1))

In a reaction vessel, 28 parts by weight of trimerized hexamethyl 1,6-diisocyanate (Desmodur® N3300, Bayer, Leverkusen) and 24 parts by weight of butyl acetate are introduced. With reflux cooling, nitrogen blanketing and stirring, a mixture of 7.0 parts by weight of N-[3-(trimethoxysilyl)propyl]butylamine (Dynasylan® 1189, EVONIK, Rheinfelden) and 10.0 parts by weight of bis[3-trimethoxysilylpropyl]amine (Dynasylan® 1124, EVONIK, Rheinfelden) is added dropwise at a rate such that a temperature of 50-60° C. is not exceeded. The reaction mixture is stirred until the NCO value, determined by means of titration, has reached the theoretically calculated NCO value of 5.2% by weight. Then 10 parts by weight of trimerized isophorone diisocyanate (Desmodur® Z4470, 70% strength in solvent naphtha) are added. The resulting mixture has an NCO value of 6.1% by weight. The resulting mixture has a theoretical solids content of 65% by weight.

Preparation Example for the Curative System (B1-2) Plus (B2-2) Used (Molar Ratio of the Structural Units (I) to the Structural Units (II) in the Compound (B2-2)=10:90, a Degree of Silanization of the Compound (B2-2) of 33 Mol %, Corresponding to a Degree of Silanization, Based on the Isocyanate Groups Originally Present in Compound (B1-2)

Plus Compound (B2-2), of 31 Mol %, and a Binder Fraction of the Polyisocyanate Parent Structure of Component (B1-2) of 5% by Weight, Based on the Sum of the Binder Fraction of the Polyisocyanate Parent Structure of Component (B1-2) and the Binder Fraction of the Polyisocyanate Parent Structure of Component (B2-2))

In a reaction vessel, 24 parts by weight of trimerized hexamethyl 1,6-diisocyanate (Desmodur® 3300, Bayer, Leverkusen) and 22 parts by weight of butyl acetate are introduced. With reflux cooling, nitrogen blanketing and stirring, a mixture of 1.0 part by weight of N-[3-(trimethoxysilyl)propyl]butylamine (Dynasylan® 1189, EVONIK, Rheinfelden) and 12.5 parts by weight of bis[3-trimethoxysilylpropyl]amine (Dynasylan® 1124, EVONIK, Rheinfelden) is added dropwise at a rate such that a temperature of 50-60° C. is not exceeded. The reaction mixture is stirred until the NCO value, determined by means of titration, has reached the theoretically calculated NCO value of 5.9% by weight. Then 2.0 parts by weight of trimerized isophorone diisocyanate (Desmodur® Z4470, 70% strength in solvent naphtha) are added. The resulting mixture has an NCO value of 6.1% by weight. The resulting mixture has a theoretical solids content of 63% by weight.

Preparation Example, Binder (A1) for Millbase

In a double-wall 4-l stainless-steel vessel, heatable by means of oil circulation thermostat and equipped with thermometer, anchor stirrer, 2 dropping funnels and reflux condenser, solvent for the polymerization is introduced. One of the dropping funnels is charged with the monomer mixture, the second dropping funnel with the initiator solution, comprising a suitable initiator (generally a peroxide). The initial charge is heated to a polymerization temperature of 140° C. When the polymerization temperature has been reached, the initiator feed is commenced first. 15 minutes after the beginning of the initiator feed, the monomer feed (duration: 240 minutes) is commenced. The initiator feed is set such that it continues for 30 minutes after the end of the monomer feed. After the end of the initiator feed, the mixture is stirred at 140° C. for a further 2 hours and then cooled to room temperature. The reaction mixture is subsequently adjusted with solvent to the binder content indicated in table 1.

TABLE 1

Composition of the polymethacrylate (A1) in parts by weight and characteristics of the polymethacrylate (A1) (acid number determined experimentally, OHN calculated theoretically, Tg calculated theoretically)

| Component | Parts by weight |
| --- | --- |
| Styrene | 8.0 |
| n-Butyl methacrylate | 8.0 |
| Acrylic acid | 0.6 |
| 4-Hydroxybutyl acrylate | 12.0 |
| 2-Hydroxyethyl acrylate | 12.0 |
| n-Butyl acrylate | 19.0 |
| Binder content 1 h 150° C. | 65% |
| Acid number (measured) [mg KOH/g] | 8-12 |
| OH number calculated [mg KOH/g] | 175 |
| Tg (FOX) [° C.] | −27 |

Preparation of the Inventive Rheological Assistant (R1) Based on Hydrophilic Silicas The two first items in Table 2 (binder (A1) and solvent are added in the stated order to a dissolver. The final item (Aerosil® 380, commercial rheological assistant based upon hydrophilic fumed silica, from Evonik Degussa, having an average primary particle size of 7 nm, a BET surface area as per DIN 66131 of 380 $m^2/g$, and an $SiO_2$ content>99.8%, based on the substance calcined at 1000° C. for 2 hours), is added with maximum shearing. This is followed by dispersing for 30 minutes. The material for milling is subsequently dispersed further in an agitated mill with grinding media 0.06-0.08 mm, with an energy input of 0.14-0.18 kWh per Kg. The temperature of the milled material here is not to exceed 65° C.

TABLE 2

Composition of the rheological assistant (R1) based on hydrophilic silicas

| Item | Component | Parts by weight |
| --- | --- | --- |
| 1 | Polyacrylate (A1) | 75 |
| 2 | Butyl acetate | 15 |
| 3 | AEROSIL ® 380 | 10 |

Preparation of the Inventive Rheological Assistant (R2) Based on Hydrophobic Silicas The first three items in Table 3 (binder (A1) and solvent) are added in the stated order to a dissolver. The final item (Aerosil® R812, commercial rheological assistant based upon hydrophobic fumed silica, from Evonik Degussa, having an average primary particle size of 7 nm, a BET surface area as per DIN 66131 of 260 $m^2/g$, and an $SiO_2$ content>99.8%, based on the substance calcined at 1000° C. for 2 hours), is added with maximum shearing. This is followed by dispersing for 30 minutes. The material for milling is subsequently dispersed further in an agitated mill with grinding media 0.06-0.08 mm, with an energy input of 0.14-0.18 kWh per Kg. The temperature of the milled material here is not to exceed 65° C.

TABLE 3

Composition of the rheological assistant (R2) based on hydrophobic silicas

| Item | Component | Parts by weight |
| --- | --- | --- |
| 1 | Polyacrylate (A1) | 45 |
| 2 | Butyl acetate | 20 |
| 3 | Butanol | 25 |
| 4 | AEROSIL ® R812 | 10 |

Formulation of the Coating Materials of Inventive Examples B1 to B6 and of the Coating Material of Comparative Examples V1 to V4, and Also of the Corresponding Coatings of Examples 1 to 6 and of Comparative Examples V1 to V4

For the production of the millbases (S1), (S2), (S4), (S5) and (S6) of the inventive examples and of the millbase (S3) of the comparative examples, the constituents indicated in table 4 are weighed out in the order stated (beginning from the top) into a suitable vessel, in this order, and stirred together intimately with one another.

TABLE 4

Composition of the millbases S1 to S6 in parts by weight

| Item | Component | Parts by weight millbase (S1) | Parts by weight millbase (S2) | Parts by weight millbase (S3) | Parts by weight millbase (S4) | Parts by weight millbase (S5) | Parts by weight millbase (S6) |
|---|---|---|---|---|---|---|---|
| 1 | Polyacrylate (A1) | 60 | 60 | 60 | 60 | 60 | 60 |
| 2a1 | rheology agent (R1) | 15 | | | | 5 | 10 |
| 2a2 | rheology agent (R2) | | 15 | | 20 | 10 | |
| 2a3 | rheology agent (R1) Setalux ® 91756[1] | | | 15 | | | 5 |
| 3 | TINUVIN ® 384 [2] | 1.5 | 1.5 | 1.5 | 1.5 | 1.5 | 1.5 |
| 4 | TINUVIN ® 292 [3] | 1.5 | 1.5 | 1.5 | 1.5 | 1.5 | 1.5 |
| 5 | BYK ® 325 [4] | 0.2 | 0.2 | 0.2 | 0.2 | 0.2 | 0.2 |

Key to table 4:
[1] Setalux ® 91756 = commercial rheology agent based on urea from Nuplex Resins, the Netherlands, dissolved or dispersed in a polyacrylate binder, with a nonvolatile fraction of 60% by weight
[2] Tinuvin ® 384 = commercial light stabilizer based on a benzotriazole, from BASF S.E.
[3] Tinuvin ® 292 = commercial light stabilizer based on a sterically hindered amine, from BASF S.E.
[4] Byk ® 325 = commercial, polyether-modified polymethylalkylsiloxane from Byk Chemie
[5] Nacure ® 4167 = commercial catalyst based on amine-blocked phosphoric acid partial ester, from King Industries, nonvolatile fraction 25%

For the preparation of the coating materials of inventive examples B1 to B6 and of the coating materials of comparative examples V1 to V4, the constituents indicated in table 5 are weighed out in the order stated (starting from the top) into a suitable vessel, in this order, and stirred together intimately with one another.

TABLE 5

Composition of the coating materials of examples B1 to B6 and of comparative examples V1 to V4 in parts by weight

| | Comp. Ex. V1 | Ex. B1 | Comp. Ex. V2 | Ex. B2 | Comp. Ex. V3 | Comp. Ex. V4 | Ex. B3 | Ex. B4 | Ex. B5 | Ex. B6 |
|---|---|---|---|---|---|---|---|---|---|---|
| Millbase (S1) | 100 | 100 | — | — | — | — | — | — | — | 100 |
| Millbase (S2) | — | — | 100 | 100 | — | — | — | — | — | — |
| Millbase (S3) | — | — | — | — | 100 | 100 | — | — | — | — |
| Millbase (S4) | — | — | — | — | — | — | 100 | — | — | — |
| Millbase (S5) | — | — | — | — | — | — | — | 100 | — | — |
| Millbase (S6) | — | — | — | — | — | — | — | — | 100 | — |
| Curing agent VB2-1 | 100 | — | 100 | — | 100 | — | — | — | — | — |
| Curing agent B1-1 + B2-1 | — | 100 | — | 100 | — | 100 | 100 | 100 | 100 | — |
| Curing agent B1-1 + B2-1 | | | | | | | | | | 100 |

The resulting coating materials of examples B1 to B6 and of comparative examples V1 to V4 are applied using a gravity-feed cup gun to Bonder metal panels (coated with a commercial cathodic electrocoat and with a commercial conventional waterborne primer-surfacer), coated with black aqueous basecoat, and are baked upright at 140° C. for 20 minutes. Before being coated with the primer-surfacer, the Bonder panels are measured using a commercial surface roughness instrument, and a determination is made of the Ra value. Application takes place in one case to "rough" quality (Ra~0.5-0.6) and in one case to "smooth" quality (Ra~0.2-0.3). The film thickness of the clearcoat is ~40 μm, that of the basecoat ~15 μm. After that the gloss is determined using the micro-haze plus gloss meter from Byk. The test results are set out in Table 6.

After 2 hours of storage at ambient temperature, a sanding site is applied to the cured clearcoat panel (using excentric compressed-air vibrating sander from 3M, 10 000 rpm, sanding disk: 3M Trizact 3000 grade). This sanding site is subsequently polished up with polishing paste (rotary polishing operation, lambs wool disk, polishing paste: Menzerna Nanopoliercreme PO 106 FA). The gloss is subsequently determined using the micro-haze plus gloss meter from Byk. The test results are set out in table 6.

TABLE 6

Test results of the coatings of examples B1 to B6 and of the coating of comparative examples V1 to V4

| | Com Ex. V1a | Ex. B1a | Comp. Ex. V1b | Ex. B1b | Comp. Ex. V2a | Ex. B2a | Comp. Ex. V2b | Ex. B2b | Comp. Ex. V3a | Comp. Ex. V4a |
|---|---|---|---|---|---|---|---|---|---|---|
| Ra/[μm] (Bonder panel) | 0.5-0.6 | 0.5-0.6 | 0.2-0.3 | 0.2-0.3 | 0.5-0.6 | 0.5-0.6 | 0.2-0.3 | 0.2-0.3 | 0.5-0.6 | 0.5-0.6 |
| SW (vertical@40 μm) | 18 | 19 | 12 | 12 | 19 | 20 | 11 | 10 | 33 | 36 |
| LW (verticla@40 μm) | 9 | 9 | 10 | 8 | 9 | 10 | 8 | 8 | 11 | 12 |

TABLE 6-continued

Test results of the coatings of examples B1 to B6 and of the coating of comparative examples V1 to V4

| | | | | | | | | | | |
|---|---|---|---|---|---|---|---|---|---|---|
| Gloss (20°) | >85 E | >85 E | >85 E | >85 E | >85 E | >85 E | >85 E | >85 E | >85 E | >85 E |
| Gloss after 9 s of polishing of a matt-sanded surface | 60-65 | 75-85 | 60-65 | 75-85 | 60-65 | 75-85 | 60-65 | 75-85 | 60-65 | 75-85 |

| | Comp. Ex. V3b | Comp. Ex. V4b | Ex. B3a | Ex. B3b | Ex. B4a | Ex. B4b | Ex. B5a | Ex. B5b | Ex. B6a | Ex. B6b |
|---|---|---|---|---|---|---|---|---|---|---|
| Ra/[µm] (Bonder panel) | 0.2-0.3 | 0.2-0.3 | 0.5-0.6 | 0.2-0.3 | 0.5-0.6 | 0.2-0.3 | 0.5-0.6 | 0.2-0.3 | 0.5-0.6 | 0.2-0.3 |
| SW (vertical@40 µm) | 20 | 22 | 21 | 14 | 20 | 13 | 22 | 14 | 18 | 12 |
| LW (verticla@40 µm) | 11 | 10 | 10 | 10 | 10 | 9 | 10 | 9 | 12 | 10 |
| Gloss (20°) | >85 E | >85 E | >85 E | >85 E | >85 E | >85 E | >85 E | >85 E | >85 E | >85 E |
| Gloss after 9 s of polishing of a matt-sanded surface | 60-65 | 75-85 | 75-85 | 75-85 | 75-85 | 75-85 | 75-85 | 75-85 | 75-85 | 75-85 |

Discussion of the Test Results

The coatings of Comparative Examples C3 and C4, based on clearcoats with a urea-based rheological assistant, always show significantly higher SW values with clearcoat film thicknesses of 40 µm, on application to cured primer-surfacer coatings, than the systems of the invention based on rheological assistants that are based on fumed silica. This difference is somewhat more apparent when a rough substrate (rough quality of the electrocoat finish) is used.

Conversely, all coatings based on clearcoat materials with a rheological assistant based on fumed silica exhibit very significantly improved short-wave values for a clearcoat film thickness of 40 µm, irrespective of whether the rheological assistant used was a hydrophilically modified fumed silica ("Aerosil® 380", rheological assistant (R1), Inventive Examples B1a, B1b, B5a, B5b, B6a, and B6b, and Comparative Examples C1a and C1b) or a hydrophobically modified fumed silica ("Aerosil® R812", rheological assistant (R2), Inventive Examples B2a, B2b, B3a, B3b, B4a, and B4b, and Comparative Examples V2a and V2b). the same improvement is shown by systems in which hydrophobic and hydrophilic Aerosil pastes are mixed (B4a and B4b) or the fraction of urea-based rheology control is reduced and is partially compensated using rheological assistants based on fumed silica (B5a and B5b). Of course, the advantage is also concentration-dependent, but produces a good result across a broad framework, as demonstrated by Inventive Examples B3a and B3b.

The comparison of Inventive Examples B1a and B1b with the corresponding Comparative Examples C1a and C1b, and the comparison of the Inventive Examples B2a and B2b with the corresponding Comparative Examples C2a and C2b, again makes it clear that through the inventive use of the curing agent mixture featuring an aliphatic isocyanate parent structure and a cycloaliphatic isocyanate parent structure, the polishability of the resultant coatings is significantly improved, independently of the particular rheological assistant used.

Depending the polarity of the solvents of the coating materials it is possible, moreover, to optimize the rheological properties, particularly the running stability of the coatings, through mixtures of at least one rheological assistant (R1) based on hydrophilic silicas and of at least one rheological assistant (R2) based on hydrophobic silicas, as in Inventive Example B4.

The invention claimed is:

1. A nonaqueous coating material composition comprising
(A) at least one polyhydroxyl-group-containing compound (A),
(B1) at least one polyisocyanate-group-containing compound (B1) having free or blocked isocyanate groups and having a cycloaliphatic polyisocyanate parent structure and/or a polyisocyanate parent structure that is derived from one such cycloaliphatic polyisocyanate by trimerization, dimerization, urethane formation, biuret formation, uretdione formation and/or allophanate formation,
(B2) at least one polyisocyanate-group-containing compound (B2), different from compound (B1), having free or blocked isocyanate groups and having an acyclic, aliphatic polyisocyanate parent structure and/or a polyisocyanate parent structure that is derived from one such acyclic aliphatic polyisocyanate by trimerization, dimerization, urethane formation, biuret formation, uretdione formation and/or allophanate formation,
(D) at least one catalyst (D) for the crosslinking of silane groups,
and
(R) at least one rheological assistant (R) based on fumed silica,
where compound (B1) and/or compound (B2) comprise at least one structural unit of the formula (I)

$$—NR—(X—SiR''_x(OR')_{3-x}) \quad (I),$$

and/or at least one structural unit of the formula (II)

$$—N(X—SiR''_x(OR')_{3-x})_n(X'—SiR''_y(OR')_{3-y})_m \quad (II),$$

where
R=hydrogen, alkyl, cycloalkyl, aryl or aralkyl, it being possible for the carbon chain to be interrupted by nonadjacent oxygen, sulfur or NRa groups, where Ra=alkyl, cycloalkyl, aryl or aralkyl,
R'=hydrogen, alkyl or cycloalkyl it being possible for the carbon chain to be interrupted by nonadjacent oxygen, sulfur or NRa groups,
X, X'=linear and/or branched alkylene or cycloalkylene radical having 1 to 20 carbon atoms, R''=alkyl, cycloalkyl, aryl or aralkyl, it being possible for the carbon chain to be interrupted by nonadjacent oxygen, sulfur or NRa groups, n=0 to 2, m=0 to 2, m+n=2, and x, y=0 to 2, with the provisos that (i) compound (B1) is used in an amount such that the solids content of the binder fraction of the isocyanate-group containing parent structure of compound (B1) is between 5% and 45% by weight of the sum of the solids content of the binder fractions of the isocyanate-group containing parent structures of compound (B1) and compound (B2), and (ii) the mixture of compounds (B1) plus (B2) includes structural units (I) and structural units (II).

2. The coating material composition of claim 1, wherein the total amount of structural units (I) in the mixture of compound (B1) plus compound (B2) is between 3 and 90 mol %, based on the entirety of the structural units (I) plus (II), and the total amount of structural units (II) in the mixture of compound (B1) plus compound (B2) is between 10 and 97 mol %, based on the entirety of the structural units (I) plus (II).

3. The coating material composition of claim 1, wherein the polyisocyanate parent structure of the compound (B1) is isophorone diisocyanate and/or 4,4'-methylene-dicyclohexyl diisocyanate and/or the isocyanurate trimer and/or allophanate dimer and/or biuret dimer thereof, and/or the polyisocyanate parent structure of the compound (B2) is 1,6-hexamethylene diisocyanate and/or the isocyanurate trimer and/or allophanate dimer and/or biuret dimer thereof.

4. The coating material composition of claim 1, wherein the compound (B2) has been prepared by reacting acyclic aliphatic polyisocyanates and/or a polyisocyanate derived from one such acyclic aliphatic polyisocyanate by trimerization, dimerization, urethane formation, biuret formation, uretdione formation and/or allophanate formation with at least one compound of the formula (Ia)

H—NR—(X—SiR''x(OR')3-x)     (Ia)

and/or with at least one compound of the formula (IIa)

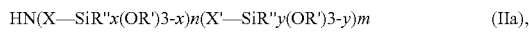

HN(X—SiR''x(OR')3-x)n(X'—SiR''y(OR')3-y)m     (IIa), and/or that compound (B1) has been prepared by reacting cycloaliphatic polyisocyanates and/or polyisocyanates derived from cycloaliphatic polyisocyanates by trimerization, dimerization, urethane formation, biuret formation, uretdione formation or allophanate formation with at least one compound of formula (Ia) and/or with at least one compound of formula (IIa), the substituents having the definition stated in claim 1.

5. The coating material composition of claim 1, wherein in compound (B1) 0 to 34 mol % of the isocyanate groups originally present have undergone reaction to form structural units (I) and/or (II), and/or in compound (B2) between 10 and 90 mol % of the isocyanate groups originally present have undergone reaction to form structural units (I) and/or (II), and/or in the mixture of polyisocyanate compound (B1) plus polyisocyanate compound (B2) between 10 and 80 mol % of the isocyanate groups originally present in (B1) plus (B2) have undergone reaction to form structural units (I) and/or (II).

6. The coating material composition of claim 1, wherein in the mixture of compound (B1) plus compound (B2)

the total amount of structural units (I) is between 10 and 50 mol % and the total amount of structural units (II) is between 50 and 90 mol %, based on the entirety of the structural units (I) plus (II), and between 25 and less than 50 mol % of the isocyanate groups originally present in (B1) plus (B2) have undergone reaction to form structural units (I) and (II)

and compound (B1) is used in an amount such that the binder fraction of the isocyanate-group-containing parent structure of compound (B1) based on solids content is between 15% and 35% by weight, based on the sum of the binder fraction of the isocyanate-group-containing parent structure of compound (B1) based on solids content plus the binder fraction of the isocyanate-group-containing parent structure of compound (B2) based on solids content.

7. The coating material composition of claim 1, wherein the coating material composition comprises as rheological assistant (R) a mixture of at least one rheological assistant (R1) based on hydrophilic silicas and at least one rheological assistant (R2) based on hydrophobic silicas.

8. The coating material composition of claim 1, wherein the rheological assistant (R) is used in a total amount of 0.01% to 10% by weight, based on the binder fraction of the coating material composition.

9. The coating material composition of claim 1, wherein the rheological assistant (R) based on fumed silica has a primary particle size of <50 nm.

10. The coating material composition of claim 1, wherein the coating material comprises from 20% to 79.98% by weight, based on the binder fraction of the coating material, of at least one hydroxyl-containing polyacrylate (A) and/or at least one hydroxyl-containing polymethacrylate (A).

11. The coating material composition of claim 1, wherein the coating material composition comprises at least one phosphorus- and nitrogen-containing catalyst (D).

12. A multistage coating process, the process comprising applying a pigmented basecoat film and thereafter a film of the coating material composition according to claim 1 atop an optionally precoated substrate.

13. The multistage coating process of claim 12, wherein after application of the pigmented basecoat film, the applied basecoat is initially dried at temperatures from room temperature to 80° C., and after the application of the coating material composition, curing takes place at temperatures from 20 to 200° C. for a time of one minute up to 10 hours.

14. A method of producing a clearcoat, the method comprising applying a clearcoat comprising the coating material composition of claim 1 as part of automotive OEM finishing, finishing of parts for installation in or on motor vehicles and/or of utility vehicles, or automotive refinishing.

15. A multicoat effect and/or color paint system comprising at least one pigmented basecoat and at least one clearcoat disposed thereon, wherein the clearcoat comprises a coating material composition according to claim 1.

* * * * *